US005493467A

United States Patent [19]
Cain et al.

[11] Patent Number: 5,493,467
[45] Date of Patent: Feb. 20, 1996

[54] YOKE SPIN VALVE MR READ HEAD

[75] Inventors: William C. Cain, San Jose; Robert Fontana; Hugo A. Santini; Mason L. Williams, III, all of San Jose, Calif.

[73] Assignee: International Business Machines Corporation, Armonk, N.Y.

[21] Appl. No.: 364,913

[22] Filed: Dec. 27, 1994

[51] Int. Cl.⁶ .......................... G11B 5/147; G11B 5/235; G11B 5/39
[52] U.S. Cl. ........................... 360/113; 360/120; 360/126
[58] Field of Search ........................... 360/113, 119–126

[56] References Cited

U.S. PATENT DOCUMENTS

| | | | |
|---|---|---|---|
| 4,291,351 | 9/1981 | Pennell et al. | 360/113 |
| 4,881,143 | 11/1989 | Bhattacharyya et al. | 360/113 |
| 4,896,235 | 1/1990 | Takino et al. | 360/113 |
| 5,097,372 | 3/1992 | Fukazawa et al. | 360/113 |
| 5,111,352 | 5/1992 | Das et al. | 360/113 |
| 5,155,644 | 10/1992 | Kira et al. | 360/113 |
| 5,159,513 | 10/1992 | Dieny et al. | 360/113 |
| 5,168,409 | 12/1992 | Koyana et al. | 360/122 |
| 5,206,590 | 4/1993 | Dieny et al. | 324/252 |
| 5,225,951 | 7/1993 | Kira et al. | 360/113 |
| 5,247,413 | 9/1993 | Shibata et al. | 360/113 |
| 5,255,141 | 10/1993 | Valstyn et al. | 360/126 |
| 5,272,582 | 12/1993 | Shibata et al. | 360/113 |
| 5,311,385 | 5/1994 | Schwarz et al. | 360/113 |
| 5,375,022 | 12/1994 | Gill et al. | 360/113 |
| 5,442,508 | 8/1995 | Smith | 360/113 |
| 5,446,613 | 8/1995 | Rottmayer | 360/113 |

OTHER PUBLICATIONS

IBM Technical Disclosure Bulletin; vol. 23, No. 10; Mar. 1981; Schwarz; "Magnetic head assembly with magnetoresistive sensor".

K. Yamada et al., "Fabrication Process for High Track Density Yoke MR Heads," IEEE Transactions on Magnetics, Vol. 26, No. 5, Sep. 1990, pp. 2406–2408.

*Primary Examiner*—Stuart S. Levy
*Assistant Examiner*—Jefferson Evans
*Attorney, Agent, or Firm*—Baker, Maxham, Jester & Meador

[57] ABSTRACT

The present invention is a yoke spin valve MR read head which electrically connects a spin valve MR sensor to spaced apart yoke portions. First and second yoke pieces are electrically connected at a head surface and are insulated from one another at a back gap which is remotely located from the head surface. The first yoke piece has a break which divides it into first and second portions which are spaced from one another. The spin valve MR sensor is located within this break and electrically interconnects the first and second portions of the first yoke piece. First and second leads are connected to the first and second yoke pieces respectively and receive a current from a current source for applying a sense current to the spin valve MR sensor via the first and second yoke pieces. When a magnetic medium is moved adjacent the head surface of the read head the yoke pieces serve as conductors for transmitting sense current to the spin valve MR sensor as well as functioning as a flux guide. Flux incursions propagated from the magnetic medium to the spin valve MR sensor via the yoke cause relative rotations between directions of magnetic moments of a pinned layer and a free layer which correspond to signals which can be processed by a signal processing device. The signal strength of the yoke spin valve MR sensor is superior to an anisotropic MR sensor and is easier to fabricate.

22 Claims, 10 Drawing Sheets

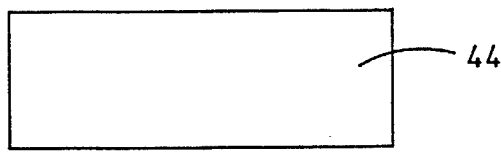
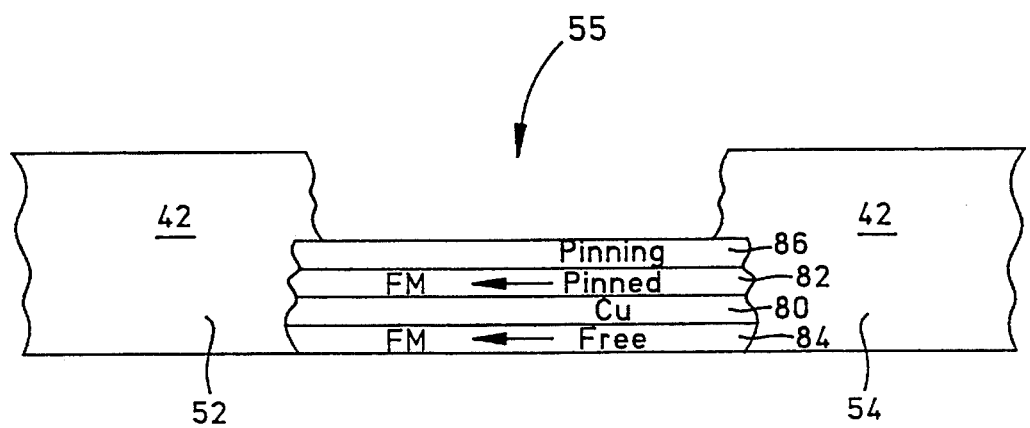
FIG. 4
FIG. 5

YOKE SPIN VALVE MR READ HEAD

CROSS REFERENCE TO RELATED ART

The present invention is related to commonly assigned U.S. Pat. No. 5,206,590 and commonly assigned U.S. Pat. No. 5,159,513 which describe spin valve magnetoresistive (MR) read heads. These patents are incorporated by reference herein.

BACKGROUND OF THE INVENTION

1. Field of the Invention

The present invention relates to a yoke spin valve magnetoresistive (MR) read head and more particularly to a yoke which is employed for carrying a sense current to a spin valve sensor.

2. Description of the Related Art

An anisotropic magnetoresistive (AMR) read head employs an MR stripe which is sandwiched between first and second gap insulation layers which are in turn sandwiched between first and second magnetic shield layers. The MR stripe changes resistance in response to flux from a moving magnetic storage medium which stores recorded data signals. Accordingly, when a sense current is conducted through the MR stripe the change in resistance of the MR stripe changes the potential across the stripe. The potential change is provided as a read back signal. Provision is normally made for longitudinally biasing the MR stripe to promote magnetic stability and for transversely biasing the MR stripe to promote linear response. In order to implement transverse biasing, a pair of magnetostatically coupled MR stripes are normally employed so that when the sense current is passed through both stripes, the stripes bias each other to appropriately rotate their magnetic moments.

The MR stripe is normally located at and forms a part of the head surface which is located immediately adjacent the moving magnetic medium, such as a rotating magnetic disk. Wear of the head surface reduces the height of the stripe, which reduces the strength of the readback signal. Further, leads, which conduct the sense current to the MR stripe, are normally at the head surface, thereby increasing the chance of shorting between the leads and the MR stripe or shorting to the moving magnetic medium. Location of active elements at the head surface also increases the threat to those elements from corrosion.

In order to protect the MR stripe it can be recessed from the head surface by employing a yoke MR read head scheme. The yoke MR read head has first and second yoke portions which are magnetically coupled across an insulative read gap at the head surface and are magnetically coupled at a back gap which is remote from the head surface. An AMR element is located in a break in one of the yoke portions, such as the first yoke portion, intermediate the read gap and the back gap. The distance of the AMR element from the head surface may be on the order of only a few microns. Insulation layers are employed between the AMR element and the first yoke portion to implement a nonconductive magnetic coupling therebetween. The yoke portions, which have the appearance of yoke portions of an inductive write head, serve as a flux guide by transferring flux received at the read gap to the AMR element. With this arrangement first and second leads are connected to the MR stripe of the AMR element for conducting the sense current. An important advantage of the yoke AMR structure is that the trackwidth of the head is not dependent upon the geometry of the recessed AMR element. The width of the yoke portions at the head surface determine trackwidth. Unfortunately, the recessed AMR element has about a 50% signal flux loss compared to a non-recessed AMR element. Therefore there is a strong felt need for an AMR read head which yields the benefits of the AMR structure, without the drawbacks encountered when the active elements are located at the head surface and without the signal loss inherent in the recessed AMR structure.

SUMMARY OF THE INVENTION

The present invention employs a spin valve MR sensor in a yoke MR scheme. A spin valve MR sensor is made up of a conductive layer which is sandwiched between a pinned layer and a free layer. The pinned layer has its magnetic moment pinned in a fixed direction by an antiferromagnetic layer or a hard magnetic layer and the free layer has a magnetic moment which is free to rotate relative to the pinned magnetic moment of the pinned layer. The relative rotation of the magnetic moments, which is caused by flux incursions, changes the resistance of the spin valve MR. Like the AMR, when a sense current is conducted through the spin valve MR, potential changes represent readback signals which can be appropriately processed. The thicknesses of the conductive, pinned and free layers are very important for establishing the desired directions of the magnetic moments. Details of the spin valve MR are described in the above referenced patents.

In our invention we directly connect the spin valve MR to the first yoke portion within its break, thus eliminating the insulation layers employed in the prior art yoke MR scheme. In contrast to prior art schemes, the first and second yoke portions of the present invention are electrically connected at the head surface. The yoke portions are then employed to carry a sense current to the spin valve MR, thus eliminating a direct connection of the first and second leads to the MR sensor. Significant departures from the prior art can be implemented because the magnetoresistive change and transverse biasing of a spin valve MR is not dependent upon the relative direction of the sense current. The magnetoresistive change is dependent upon the angle of the magnetic moment of the free layer relative to the angle of the magnetic moment of the pinned layer and linear response is established by the geometry of the spin valve MR. By eliminating the insulation layers necessary in the prior art, signal response is significantly improved. In the present invention, leads for conducting sense current to the yoke portions can be near the back gap and can be larger so as to reduce sensor resistance and increase signal to noise ratio. The present yoke spin valve MR also allows many desirable schemes for orientation of the magnet moments of the pinned and free layers relative to the direction of flux propagation.

An object of the present invention is to provide a yoke spin valve MR read head.

Another object is to provide a read head wherein a highly sensitive MR sensor is not subjected to shorting, wear and corrosion at the head surface.

A further object is to simplify the construction of an MR read head and improve its performance.

Other objects and advantages of the present invention will be readily apparent to one skilled in the art upon reading the following specification taken with the accompanying drawings.

DESCRIPTION OF THE DRAWINGS

FIG. 4 is a vertical cross section of a first embodiment of the invention taken through a yoke spin valve MR transverse the longitudinal direction of a yoke piece.

FIG. 5 is a vertical cross section of the first embodiment of the invention taken through a yoke spin valve MR piece along the longitudinal direction of the yoke piece.

DESCRIPTION OF THE PREFERRED EMBODIMENTS

Figure 1:
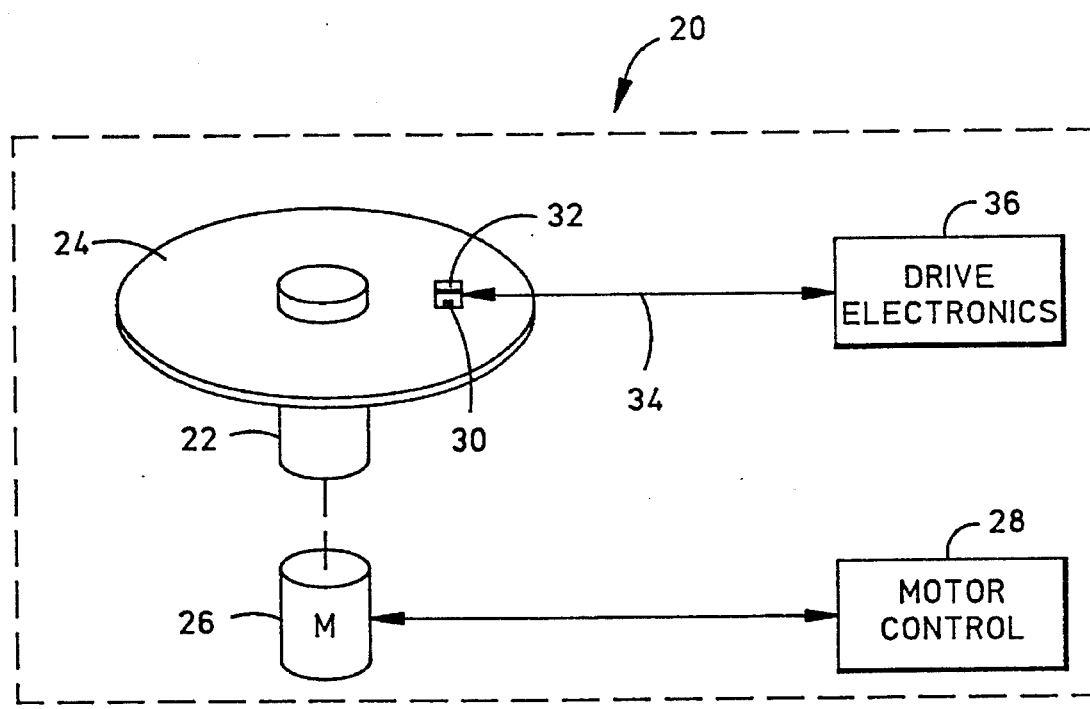
FIG. 1 is a schematic illustration of a disk drive which employs the present invention.

Referring now to the drawings wherein like reference numerals designate like or similar parts throughout the several views, there is illustrated in FIG. 1 a magnetic disk drive 20. The disk drive 20 includes a spindle 22 which supports a magnetic disk 24. The spindle 22 is rotated by a motor 26 which is controlled by motor control 28. A magnetic head 30, is mounted on a slider 32 which is, in turn, supported by a suspension and actuator arm 34. The suspension and actuator arm 34 position the slider 32 so that the magnetic head 30 is in a transducing relationship with a surface of the magnetic disk 24. When the disk 24 is rotated by the motor 26 the slider contacts or rides on a thin cushion of air (air bearing) slightly off the surface of the disk. The magnetic head 30 is then employed for reading tracks on the surface of the disk 24. The read signals, as well as control signals for moving the slider to various tracks, are processed by drive electronics 36. If desired, the magnetic head 30 may be a combined read and write head having the well-known "piggyback" structure. The magnetic head 30 may also be employed in a magnetic tape drive (not shown) for reading magnetic tapes.

Figure 2:
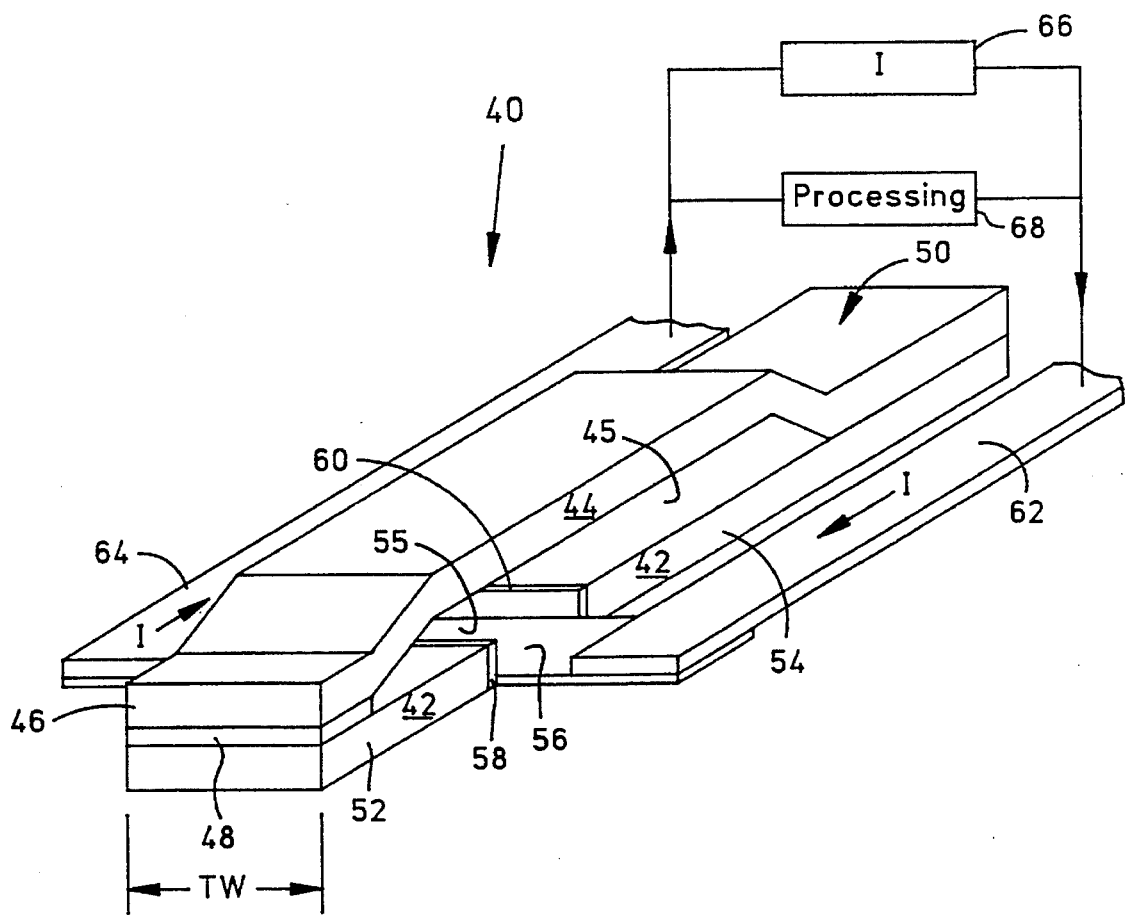
FIG. 2 is an isometric illustration of a prior art yoke AMR read head.

FIG. 2 shows a prior art yoke anisotropic magnetoresistive (AMR) head 40 which includes first and second yoke pieces 42 and 44. The first and second yoke pieces 42 and 44 are spaced from one another at an ABS or head surface 46 to form a transducing read gap 48 and are electrically joined at a back region 50 which is spaced from the read gap. The gap 48 between the yoke pieces 42 and 44 at the head surface is typically filled with an insulation layer such as alumina. Further, an insulation layer (not shown) may be located at 45 between the first and second yoke pieces 42 and 44. The first yoke piece 42 has first and second portions 52 and 54 which are spaced from one another intermediate the head surface 46 and the back region 50 to form a break 55, the first portion 52 extending form the head surface to the break and the second portion 54 extending from the break to the back region 50. The yoke pieces 42 and 44 may be any suitable magnetic material such as Permalloy.

An anisotropic magnetoresistive (AMR) sensor 56 is located in the break and is insulated from the first and second portions 52 and 54 of the first yoke piece 42 by insulation layers 58 and 60. Accordingly, when a magnetic medium, such as a magnetic disk, is moved adjacent the head surface 46 the yoke pieces 42 and 44 function as a flux guide for propagating flux to the AMR sensor 56. The width of the AMR sensor 56 extends beyond the width of the first yoke piece 54 so that leads 62 and 64 can be connected thereto. The leads 62 and 64 transmit a sense current I through the AMR sensor from current source 66. Flux incursions through the AMR sensor 56 cause changes in resistance of the AMR sensor 56 which results in potential changes across the leads 62 and 64, these potential changes being detected and processed by processing circuitry 68. When a sense current is transmitted through a pair of MR stripes (not shown), which comprise the AMR sensor 56, the MR stripes back bias each other to linearize the response of the sensor. A longitudinal biasing scheme (not shown) would also be employed for stabilizing the response of the sensor.

One of the advantages of the yoke MR read head is that the trackwidth (TW) of the read head is not dependent upon the geometry of the AMR sensor 56. The trackwidth is dependent upon the width of the first and second yoke pieces 42 and 44 at the head surface 46. The most significant problem with the prior art yoke AMR read head 40 is that there is a considerable loss of signal strength at the AMR sensor 56 due to the insulation layers 58 and 60. The head 40 is constructed with thin film technology employing photolithographic patterning techniques. The fabrication of the head is somewhat tedious in the sensor area because of the insulation layers 58 and 60 and making connection of the leads 62 and 64 to the extensions of the AMR sensor 56. It should be noted that magnetoresistive change and linear biasing of the AMR sensor 56 is dependent upon the direction of the sense current therethrough. This direction is transverse to the first and second yoke pieces 42 and 44. Accordingly, this dictates the positioning of the leads as shown in FIG. 2.

Figure 3:
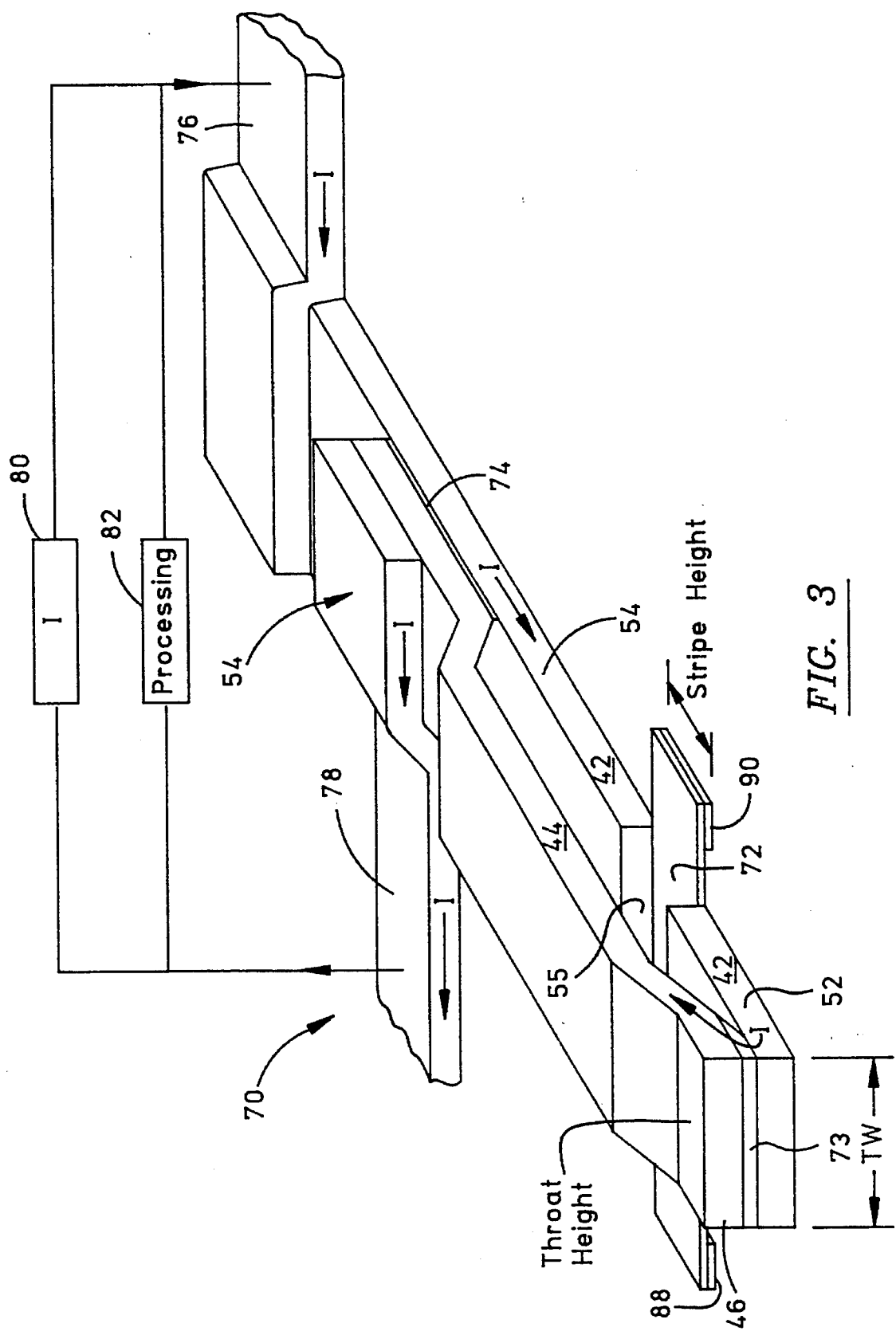
FIG. 3 is an isometric illustration of the present invention.

A yoke spin valve MR read head 70, according to the present invention, is shown in FIG. 3. The read head 70 includes a spin valve MR sensor 72 which is located in the break 55 between the first and second portions 52 and 54 of the first yoke piece 42. An important difference between a spin valve MR sensor and an AMR sensor is that the magnetoresistive response and linear biasing of the spin valve MR sensor is not dependent upon the direction of the sense current. Accordingly, the present invention directly electrically connects the spin valve MR sensor to the first yoke piece portions 52 and 54 without any insulation layers 58 and 60 therebetween as shown in FIG. 2. The yoke pieces 42 and 44 are then employed as conductors for transmitting a sense current through the spin valve MR sensor 72. In order to accomplish this objective, the yoke pieces 42 and 44 are electrically connected by a gap layer 73 at the head surface 46 and are electrically insulated from one another by an insulation layer 74 at a back gap 75. This electrical arrangement is just the reverse of the electrical arrangement shown for the prior art head 40 in FIG. 2. The gap layer 73 may be NiP. First and second conductive leads 76 and 78 are then connected to the first and second yoke pieces 42 and 44 at or near the back gap 75. Leads 76 and 78 are then connected to a current source 80 for applying the sense current to the spin valve MR sensor 72. Processing circuitry 82 across the current lines sense potential changes which correspond to signals received by the spin valve MR sensor 72. The leads 76 and 78, which are easier to construct than the prior art leads, can be made larger than the prior art leads so as to improve the signal to noise ratio of the spin valve MR sensor 72. The present invention allows many different arrangements for the directions of the magnetic moments of the various layers of the spin valve MR sensor 72 which will be explained in more detail hereinafter.

FIG. 4 is a transverse vertical section of the spin valve MR sensor 72 showing its various layers. The spin valve MR sensor 72 includes a conductive layer 80, which may be copper, sandwiched between a pinned layer 82 and a free layer 84, the pinned and free layers being of a ferromagnetic material. The pinned layer 82 has the direction of its magnetic moment pinned in a predetermined position by a pinning layer 86 which is a layer of antiferromagnetic material. The direction of the magnetic moment of the free layer 84 is free to rotate relative to the fixed direction of the magnetic moment of the pinned layer 82. It is the relative directions of the magnetic moments in the free and pinned layers 84 and 82 which correspond to magnetoresistive changes in the spin valve MR sensor and which, in turn, correspond to signals. In order to magnetically stabilize the free layer 84 longitudinal biasing layers 88 and 90 are employed which are adjacent to the free layer 84 in a spaced apart relationship. The spacing between the longitudinal biasing layers 88 and 90, which may be on the order of one to two microns, establishes the active region of the spin valve MR sensor 72. The longitudinal biasing layers 88 and 90 may be antiferromagnetic material or hard magnetic material. If the material is antiferromagnetic it is exchange coupled (directly connected) to the free layer 84, whereas if the layers 88 and 90 are hard magnetic material they may be either directly connected or separated by an insulation layer. These arrangements and resulting directions of the magnetic moments will be explained in more detail hereinafter.

A longitudinal transverse cross section of the spin valve MR 72 is shown in FIG. 5. Typical thicknesses for a spin valve MR sensor are 22 Å for the conductive layer 80, 50 Å for the pinned and free layers 82 and 84, and 100 Å for the pinning layer 86. Thickness of the first yoke portions 52 and 54 may be 1,000 to 10,000 Å. The relative thicknesses of the conductive layer 80, the pinned layer 82 and the free layer 84 are critical for establishing desired spin valve MR characteristics. The direction of the magnetic moment of the pinned layer 82 is controlled by the pinning layer 86. The direction of the magnetic moment of the free layer 84 is dependent on the thickness of the conductive layer 80. If the conductive layer 80 is thick enough the direction of the magnetic moment of the free layer 84 is controlled by magnetostatic coupling with the pinned layer 82. If the conductive layer 80 is sufficiently thin, the direction of the magnetic moment of the free layer 84 is controlled by exchange coupling with the pinned layer 82. In the present invention the conductive layer 80 is thick enough to cause a magnetostatic coupling between the free layer 84 and the pinned layer 82 to dominate over exchange coupling between these layers. Each of the pinned and free layers 82 and 84 should have a thickness to width ratio greater than 1/1,000 and the conductive layer 80 should be ½ as thick as either of the pinned and free layers.

Figure 6A:
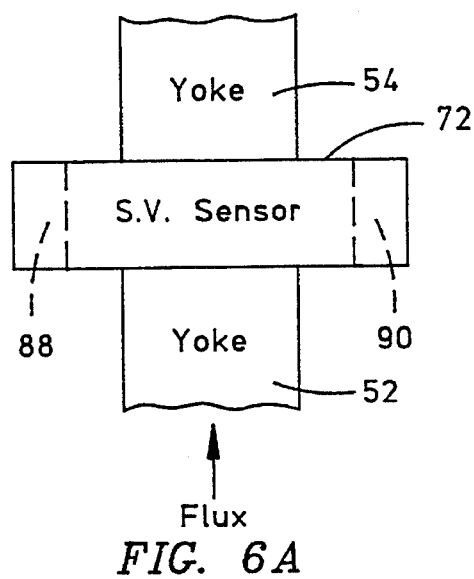
FIG. 6A is a schematic plan view of the spin valve MR sensor and a portion of the yoke piece of the first embodiment of the invention.
Figure 6B:
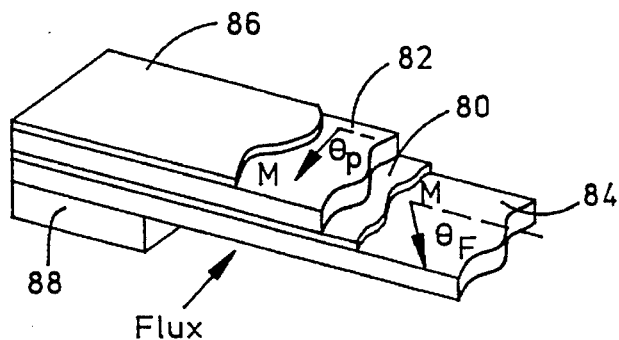
FIG. 6B is a schematic illustration of the spin valve MR sensor removed from the yoke piece of FIG. 6A with portions cut away to shown various details.

FIG. 6A is a schematic plan view of the spin valve sensor 72 sandwiched between the first yoke portions 52 and 54 and in direct electrical contact therewith. The longitudinal biasing layers are shown at 88 and 90. As shown in FIG. 6B the antiferromagnetic pinning layer 86 may be employed for pinning the direction of the magnetic moment of the pinned layer 82 parallel to the direction of the magnetic flux propagation as shown in FIGS. 6A and 6B. This direction is a 90° angle $\theta_P$ to the longitudinal extension of the spin valve MR sensor. Normally, the direction of the magnetic moment of the free layer 84 is antiparallel to the direction of the magnetic moment of the pinned layer 82, however, due to the coupling of the first yoke portions 52 and 54 adjacent the spin valve MR senor, the magnetic moment of the free layer assumes parallel direction (not shown) with respect to the direction of the magnetic moment in the pinned layer 82. This is caused by the exchange coupling between the layers 82 and 84 which is stronger than the magnetostatic coupling therebetween and a demagnetizing influence of the yoke portions 52 and 54. The direction of the magnetic moment of the free layer is rotated from a parallel direction (not shown) to angle $\theta_F$ to the longitudinal direction of the spin valve MR sensor 72. When flux incursions are transmitted to the spin valve MR sensor 72 via the yoke portions 52 and 54, the direction of the magnetic moment of the free layer rotates relative to the direction of the magnetic moment of the pinned layer 82 which is representative of signals read from a moving magnetic medium adjacent the head surface of the read head as shown in FIG. 1.

Figure 7A:
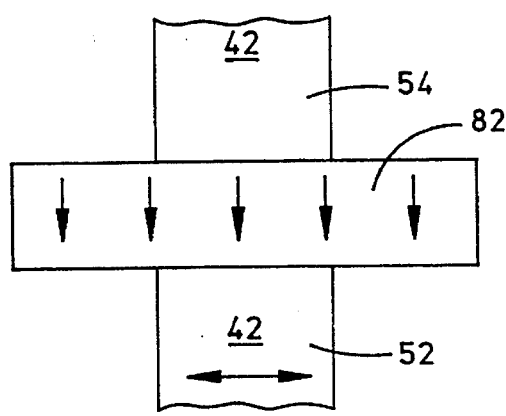
FIGS. 7A and 7B are schematic illustrations of the directions of the magnetic moments of the pinned layer and the free layer of the spin valve MR sensor of the first embodiment of the invention employing antiferromagnetic layers to pin the direction of the magnetic moment of the pinned layer.
Figure 7B:
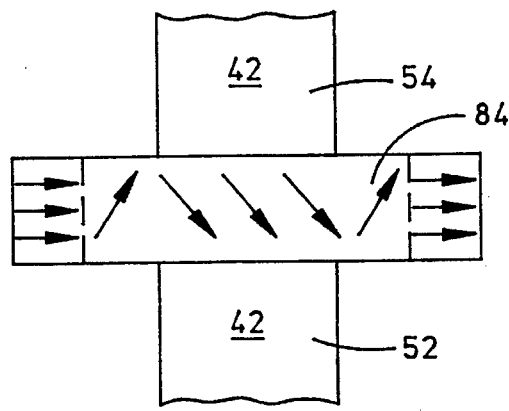

FIG. 7A illustrates the direction of the magnetic moment of the pinned layer 82 for the first embodiment of the invention shown in FIGS. 6A and 6B. If antiferromagnetic material is employed for the longitudinal biasing layers 88 and 90, as shown in FIG. 6A, the directions of the magnetic moments within the free layer 84 are shown in FIG. 7B. FIG. 7B illustrates the lack of influence of the first yoke portions 52 and 54 on the magnetic moments outside the width of the yoke portions 52 and 54. These moments are oriented more in an antiparallel relationship with respect to the direction of the magnetic moments of the pinned layer 82. Accordingly, the directions of the magnetic moments within the free layer 84 outside the width of the first yoke pieces 52 and 54 are controlled more by magnetostatic coupling with the pinned layer 82, whereas the directions of the magnetic moments within the width of the first yoke piece portions 52 and 54 are controlled more by exchange coupling with the pinned layer 82 due to the demagnetizing influence of the first yoke piece portions 52 and 54.

Figure 8A:
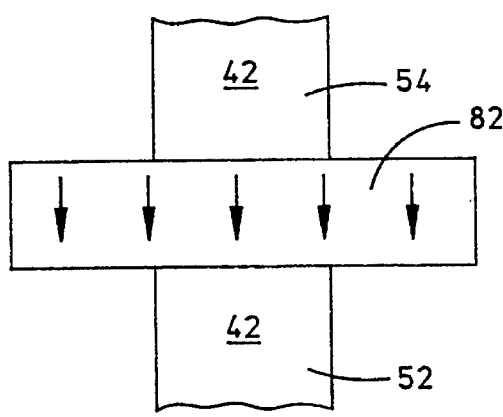
FIGS. 8A and 8B are schematic illustrations of the directions of the magnetic moments of the pinned layer and the free layer of the spin valve MR sensor of the first embodiment of the invention employing hard magnetic layers to pin the direction of the magnetic moment of the pinned layer.
Figure 8B:
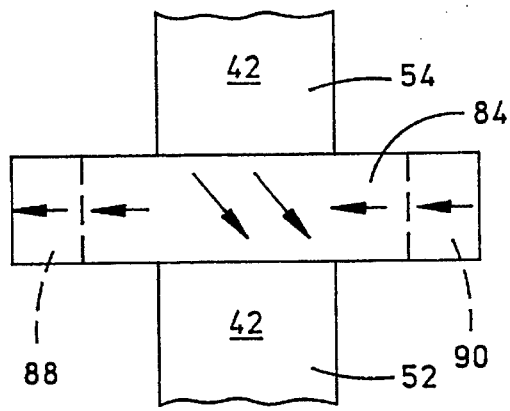

FIGS. 8A and 8B illustrate the directions of the magnetic moments of the pinned layer 82 and the free layer 84 if a hard magnetic material is employed for the longitudinal biasing layers 88 and 90, shown in FIG. 6A. As shown in FIG. 8A, the direction of the magnetic moment in the pinned layer 82 remains unchanged. In a center region of the active portion of the free layer 84 the magnetic layers 88 and 90 cause the direction of the magnetic moment to be rotated counterclockwise to the positions shown. On each side of the center region, the magnetic moments have been rotated into alignment with the directions of the magnetic moments of the magnetic layers 88 and 90.

Figure 9A:
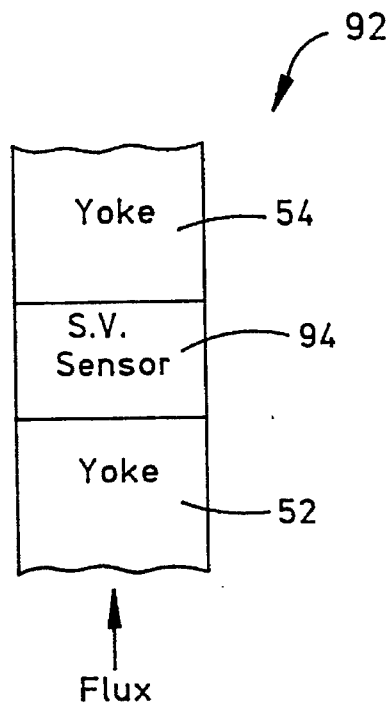
FIGS. 9A and 9B, which are similar to FIGS. 6A and 6B, illustrate a second embodiment of the invention.
Figure 9B:
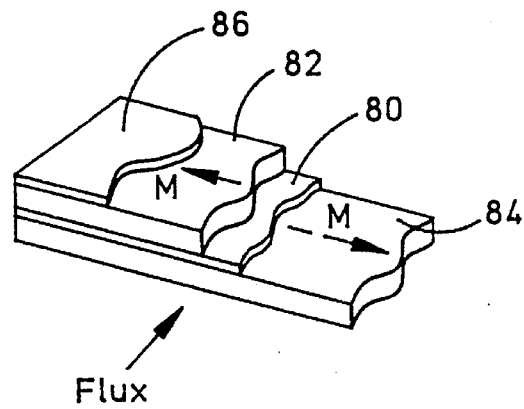
Figure 10A:
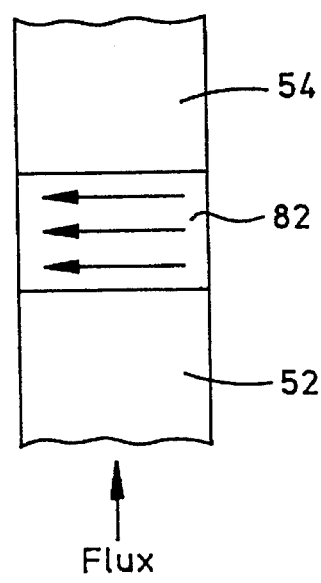
FIGS. 10A and 10B, which are similar to FIGS. 7A and 7B, illustrate magnetic moments of the second embodiment of the invention.
Figure 10B:
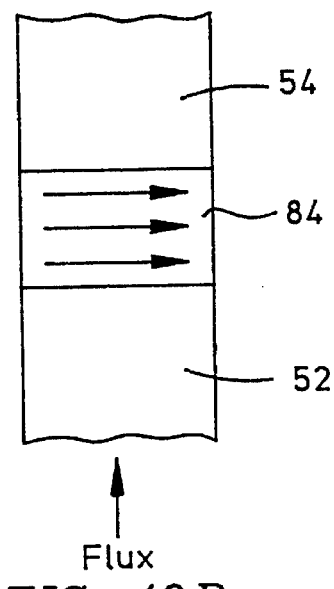

FIGS. 9A and 9B illustrate a second embodiment 92 of the present invention. In this embodiment the spin valve MR sensor 94 is the same width as the first yoke piece portions 52 and 54. The directions of the magnetic moments of the pinned layer 82 and the free layer 84 are antiparallel with respect to one another and are aligned with the longitudinal axis of the sensor. The directions of the magnetic moments for the pinned layer 82 and the free layer 84 are also illustrated in FIGS. 10A and 10B. This type of spin valve MR sensor may be referred to as a self-aligned type since it does not rely upon longitudinal biasing layers 88 and 90, as shown in FIG. 6A. Upon the incidence of flux incursions, the magnetic moment of the free layer 84 will rotate relative to the fixed magnetic moment of the pinned layer 82. The relative angle between these magnetic moments is indicative of the signal received.

Figure 11A:
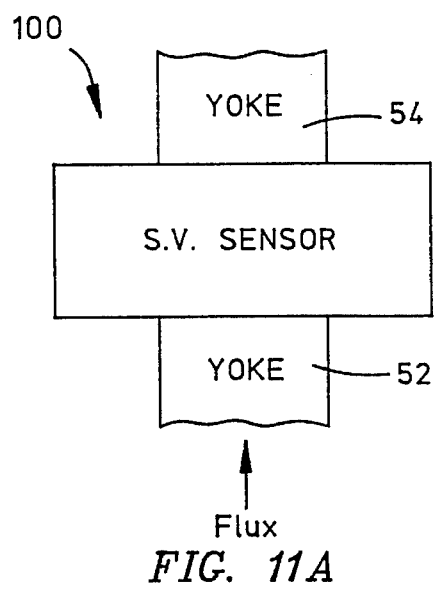
FIGS. 11A and 11B, which are similar to FIGS. 6A and 6B, illustrate a third embodiment of the invention.
Figure 11B:
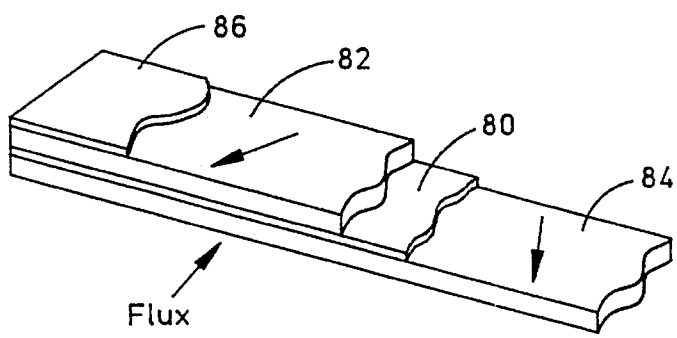
Figure 12A:
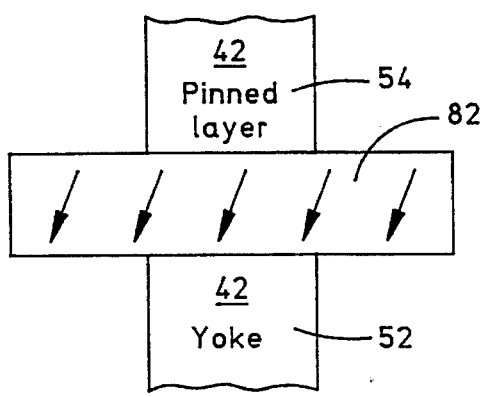
FIGS. 12A and 12B, which are similar to FIGS. 7A and 7B illustrate magnetic moments of the third embodiment of the invention.
Figure 12B:
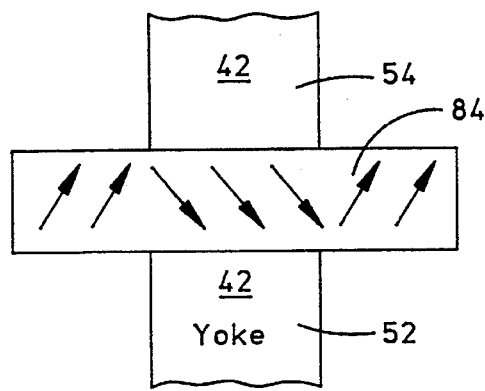

FIGS. 11A and 11B illustrate a third embodiment 100 of the present invention. In this embodiment the direction of the magnetic moment of the pinned layer 82 is slanted at an angle to the direction of flux propagation as shown in FIGS. 11B and 12A. As shown in FIG. 12B the direction of the magnetic moments of the free layer 82 will be antiparallel to the direction of the magnetic moments of the pinned layer 82 in the extensions of the free layer beyond the width of the first yoke piece portions 52 and 54. The normally antiparallel direction of the magnetic moment of the portion of the pinned layer 82 within the width of the portions 52 and 54 has a slight angle to the direction of the flux propagation. Again, the relative rotations between the directions of the magnetic moments of the layers 82 and 84 are indicative of the signals received.

Figure 13:
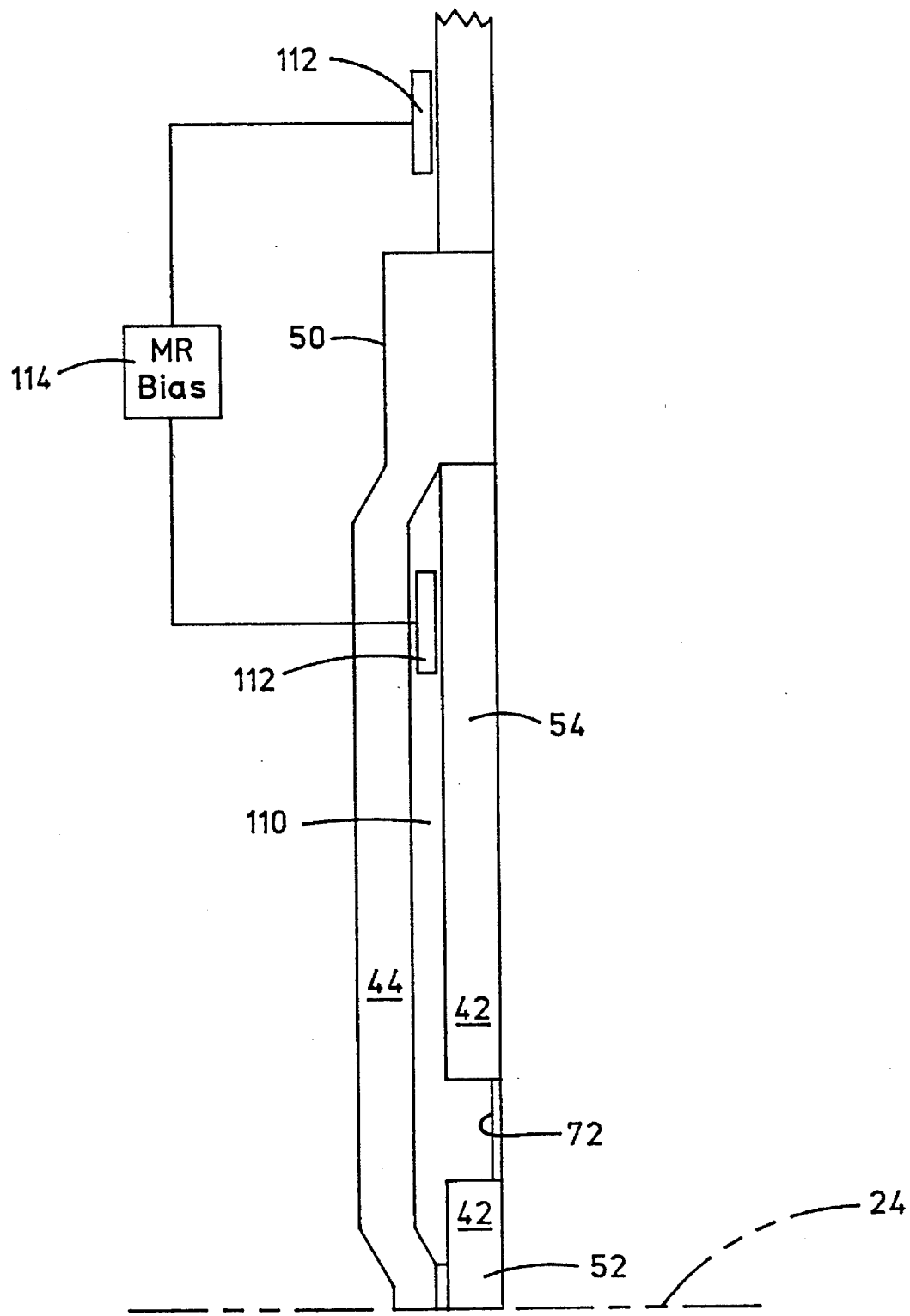
FIG. 13 is a vertical cross section of the yoke spin valve MR read head with a coil shown for selectively biasing the spin valve MR.

FIG. 13 is a modification which can be applied to any of the aforementioned embodiments of the present invention. Within the space 110 and about the back gap 50 is a coil layer 112 which may be fed a predetermined current by biasing circuitry 114. When current is transmitted through the coil layer 112 a predetermined mount of magnetic flux will be induced into the spin valve MR sensor 72 for maintaining the quiescent flux level in a center of the dynamic range of the sensor even though there are external flux disturbances or yoke hysteresis. This arrangement can also be employed for establishing the dynamic range when all of the designed components fall short of accomplishing the design goals.

Figure 14:
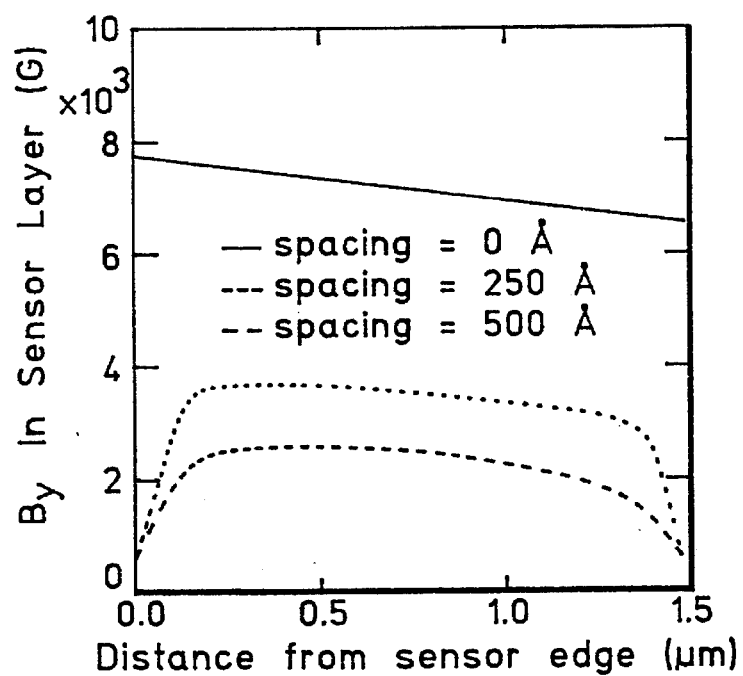
FIG. 14 is a chart showing sensor field strength By versus distance from the sensor edge (head surface) for various insulation thicknesses between the MR sensor and the yoke portion.

FIG. 14 are magnetic simulation results for one gigabit per square inch (Gb/in$^2$) yoke head structure with a 1.5 μm stripe height sensor, the thickness of the sensor being 90 Å, the throat of the head being 0.5 μm and the transition centered at 0.7 μm. The chart shows the flux field strength B$_y$ in the sensor versus the distance from the sensor edge in microns for insulation spacing between the sensor and the yoke portions of 0 Å, 250 Å and 500 Å. This chart shows that a direct electrical connection of the sensor with the yoke portions 52 and 54 results in a significantly higher field strength within the sensor.

Figure 15:
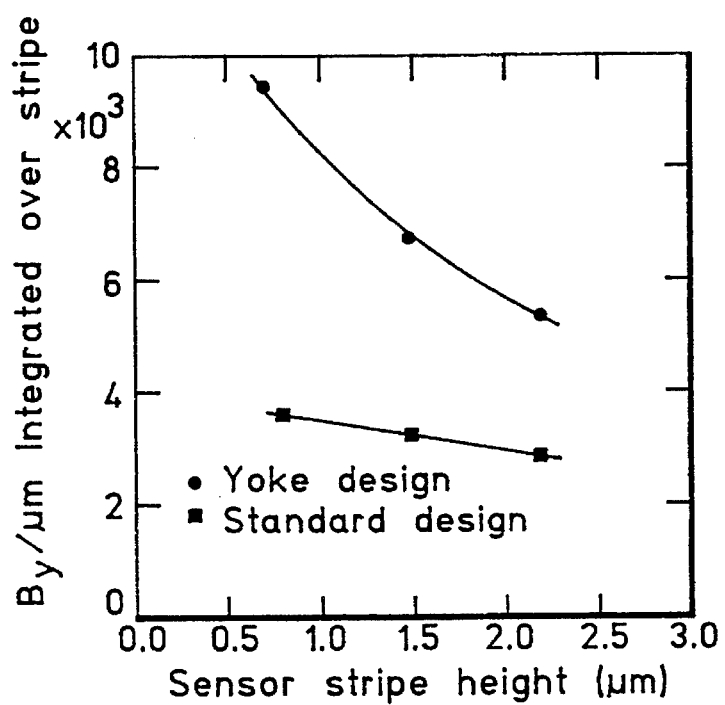
FIG. 15 is a chart of total flux at the center of the MR sensor versus sensor height.

FIG. 15 is a chart showing the total flux at the center of the sensor as a function of stripe height for a yoke sensor which is directly connected to the yoke as taught by the present invention and a standard nonrecessed sensor. It can be seen from this chart that the present invention produces significantly higher field strengths than the standard nonrecessed sensor.

Figure 16:
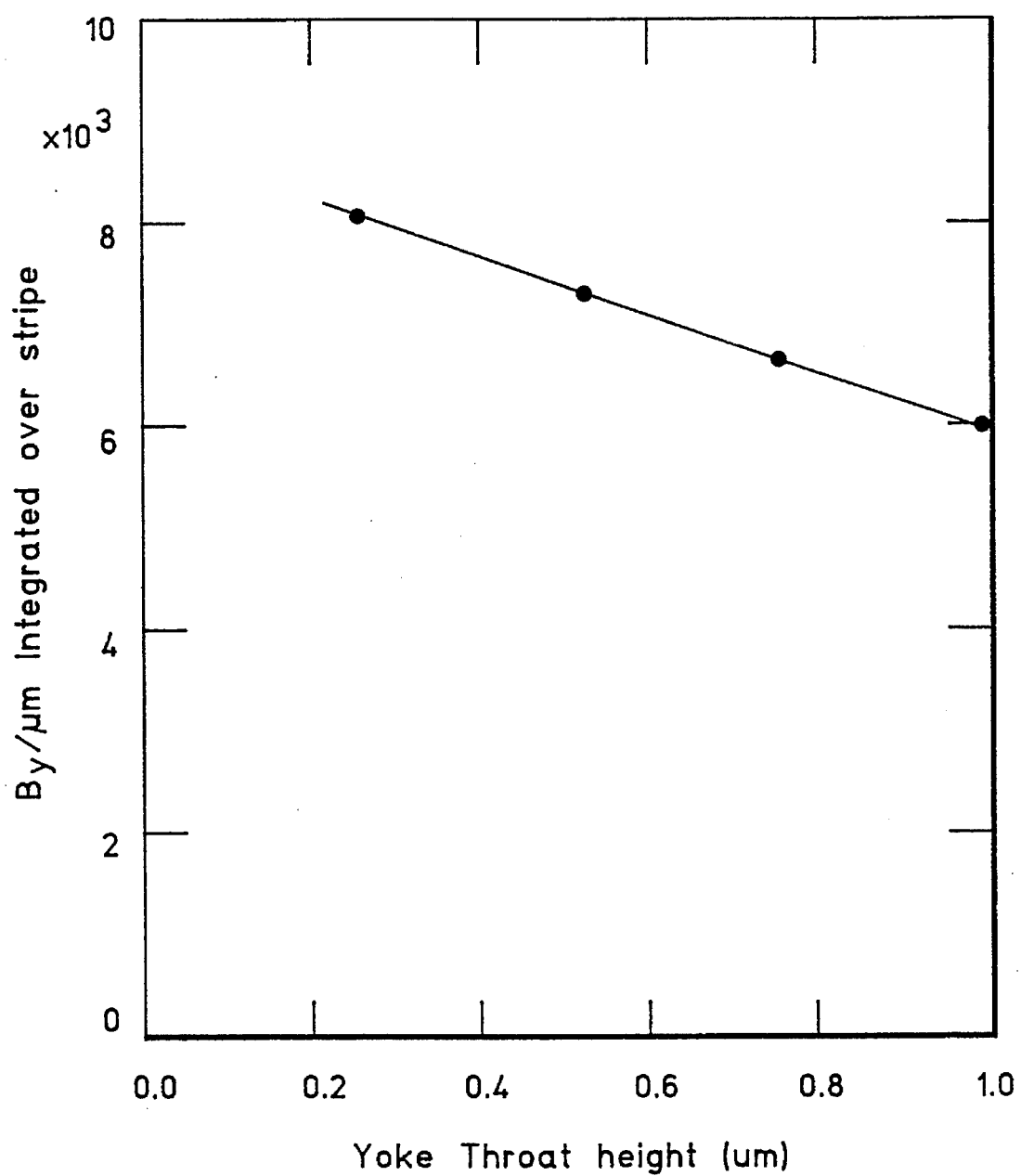
FIG. 16 is a chart of total flux in the MR sensor versus yoke throat height.

FIG. 16 is a chart showing magnetic simulation results for one Gb/in$^2$ yoke head structure with a 1.5 μm stripe height sensor, the thickness of the sensor being 90 Å, the sensor being electrically connected to the yoke and the transition centered at 0.7 μm from the throat height. This chart shows total signal flux in the sensor as a function of the yoke throat height. This chart also shows that even as the head surface is worn away the field strength of the spin valve sensor is not substantially affected.

In referring to FIG. 3, typical dimensions for a 1 Gb/in.$^2$ yoke spin valve sensor are a stripe height of 1.5 μm, a trackwidth of 1.5 μm and a throat height of 0.5 μm.

Obviously, other embodiments and modifications of the invention will occur to those of ordinary skill in the art in view of the above teachings. Therefore, the invention is to be limited only by the following claims, which include all of such embodiments and modifications when viewed in conjunction with the above specification and accompanying drawings.

We claim:

1. A yoke spin valve magnetoresistive (MR) read head which has a head surface to be positioned adjacent a magnetic medium for reading recorded magnetic signals thereon, said MR read head comprising:

a first yoke piece and a second yoke piece;

the first and second yoke pieces extending from a transducing read portion proximate the head surface to a back region spaced from the head surface to form a back gap;

the first and second yoke pieces being magnetically coupled and electrically connected by a gap layer at the read portion, and the first and second yoke pieces being magnetically coupled and electrically isolated at the back gap;

the first yoke piece having first and second portions which are spaced from one another intermediate the read portion and the back gap to form a break, the first portion extending from the head surface to the break and the second portion extending from the break to the back gap; and a spin valve MR sensor located in the break and electrically connected to each of the first and second portions of the first yoke piece so as to electrically connect said first and second portions.

2. A yoke spin valve MR read head as claimed in claim 1 including:

a first electrically conductive lead connected to the second portion of the first yoke piece and a second electrically conductive lead connected to the second yoke piece.

3. A yoke spin valve MR read head as claimed in claim 2 including:

the first portion of the first yoke piece, the spin valve MR sensor, the second portion of the first yoke piece and the second yoke piece all being electrically conductive so that the electrically conductive leads can transmit a sense current through the spin valve MR sensor.

4. A magnetic medium drive including the yoke spin valve MR read head of claim 3 including:

a support;

means mounted on the support for moving a magnetic medium;

means mounted on the support for supporting the yoke spin valve MR read head adjacent the magnetic medium when the magnetic medium is moving;

means connected to the support for transmitting a sense current to the MR read head; and processing means connected across the means for transmitting for sensing voltage changes as a function of flux propagation magnitude through the yoke spin valve MR sensor.

5. A yoke spin valve MR read head as claimed in claim 2 including:

at least a single turn of a coil layer about the back gap and having a portion between the first and second yoke pieces; and means connected to said single turn of said coil layer for transmitting a current therethrough to selectively bias the spin valve MR sensor.

6. A yoke spin valve MR read head as claimed in claim 2 wherein the spin valve MR read head includes:

a conductive layer of thin film conductive material sandwiched between a pinned layer of thin film magnetic material and a free layer of thin film magnetic material; and an antiferromagnetic layer of thin film antiferromagnetic material exchange coupled to the pinned layer for pinning a magnetic moment of the pinned layer at a fixed angle.

7. A yoke spin valve MR read head as claimed in claim 6 including:

each of the pinned and free layers having a thickness to width ratio greater than 1/1,000 and the conductive layer being substantially ½ as thick as either of the pinned and free layers.

8. A magnetic medium drive including the yoke spin valve MR read head of claim 2 including:

a support;

means mounted on the support for moving a magnetic medium;

means mounted on the support for supporting the yoke spin valve MR read head adjacent the magnetic medium when the magnetic medium is moving;

means connected to the support for transmitting a sense current to the MR read head; and processing means connected across the means for transmitting for sensing voltage changes as a function of flux propagation magnitude through the yoke spin valve MR sensor.

9. A yoke spin valve MR read head as claimed in claim 2 including:

an electrically insulative layer sandwiched between the first and second yoke pieces at the back gap; and an electrically conductive layer sandwiched between the first and second yoke pieces at the read portion.

10. A yoke spin valve MR read head as claimed in claim 9 including:

each of the first and second portions of the first yoke piece being a thin film layer and being substantially coplanar; and the spin valve MR sensor having thin film layers substantially parallel with respect to one another and to the layers of the first and second portions of the first yoke piece.

11. A yoke spin valve MR read head as claimed in claim 10 including:

the spin valve MR sensor having a pinned layer, the pinned layer having a magnetic moment which is pinned relative to a direction of flux propagation in the presence or absence of an applied field causing the flux propagation.

12. A yoke spin valve MR read head as claimed in claim 11 including:

the spin valve MR sensor having a free layer, the free layer having a magnetic moment which is directed at an angle to the direction of the magnetic moment of the pinned layer in the absence of said applied field and which varies from said angle when said applied field is applied.

13. A magnetic medium drive including the yoke spin valve MR read head of claim 12 including:

a support;

means mounted on the support for moving a magnetic medium;

means mounted on the support for supporting the yoke spin valve MR read head adjacent the magnetic medium when the magnetic medium is moving;

means connected to the support for transmitting a sense current to the MR read head; and processing means connected across the means for transmitting for sensing voltage changes as a function of flux propagation magnitude through the yoke spin valve MR sensor.

14. A yoke spin valve MR read head as claimed in claim 12 including:

said pinned layer, the pinned layer having a magnetic moment which is directed substantially perpendicular to the direction of flux propagation.

15. A yoke spin valve MR read head as claimed in claim 12 including:

said pinned layer, the pinned layer having a magnetic moment which is canted to the direction of flux propagation in the presence or absence of said applied field.

16. A yoke spin valve MR read head as claimed in claim 12 including:

said pinned layer, the pinned layer having a magnetic moment which is directed substantially antiparallel to the direction of flux propagation.

17. A yoke spin valve MR read head as claimed in claim 16 including:

free layer biasing means coupled to the free layer for biasing the free layer to said angle in the absence of said applied field.

18. A yoke spin valve MR read head as claimed in claim 17 including:

the free layer biasing means being spaced apart biasing layers coupled to the free layer, the space between the biasing layers defining a width of an active region of the spin valve MR sensor; and the width of the active region being in the range of 1–2 μm.

19. A yoke spin valve MR read head as claimed in claim 18 wherein the biasing means are antiferromagnetic layers exchange coupled to the free layer.

20. A magnetic medium drive including the yoke spin valve MR read head of claim 19 including:

a support;

means mounted on the support for moving a magnetic medium;

means mounted on the support for supporting the yoke spin valve MR read head adjacent the magnetic medium when the magnetic medium is moving;

means connected to the support for transmitting a sense current to the MR read head; and processing means connected across the means for transmitting for sensing voltage changes as a function of flux propagation magnitude through the yoke spin valve MR sensor.

21. A yoke spin valve MR read head as claimed in claim 18 wherein said free layer biasing means are hard magnetic layers which are magnetostatically coupled to the free layer.

22. A yoke spin valve MR read head as claimed in claim 17 wherein the free layer biasing means includes:

at least a single turn of a coil layer about the back gap and having a portion between the first and second yoke pieces; and means connected to said single turn of coil layer for transmitting a current therethrough to selectively bias the free layer of the spin valve MR sensor.

* * * * *

UNITED STATES PATENT AND TRADEMARK OFFICE
CERTIFICATE OF CORRECTION

PATENT NO.   : 5,493,467
DATED        : February 20, 1996
INVENTOR(S)  : Cain et al It is certified that error appears in the above-indentified patent and that said Letters Patent is hereby corrected as shown below:

```
Column 10, line 31, delete "pinned layer, the";
          line 36, delete "pinned layer, the"; and
          line 41, delete "pinned layer, the".
```

Signed and Sealed this

Thirteenth Day of August, 1996

Attest:

BRUCE LEHMAN

Attesting Officer

Commissioner of Patents and Trademarks